March 17, 1925.
R. A. HOFFMANN
STOP MECHANISM REGISTER
Original Filed Nov. 26, 1921   2 Sheets-Sheet 1
1,530,366
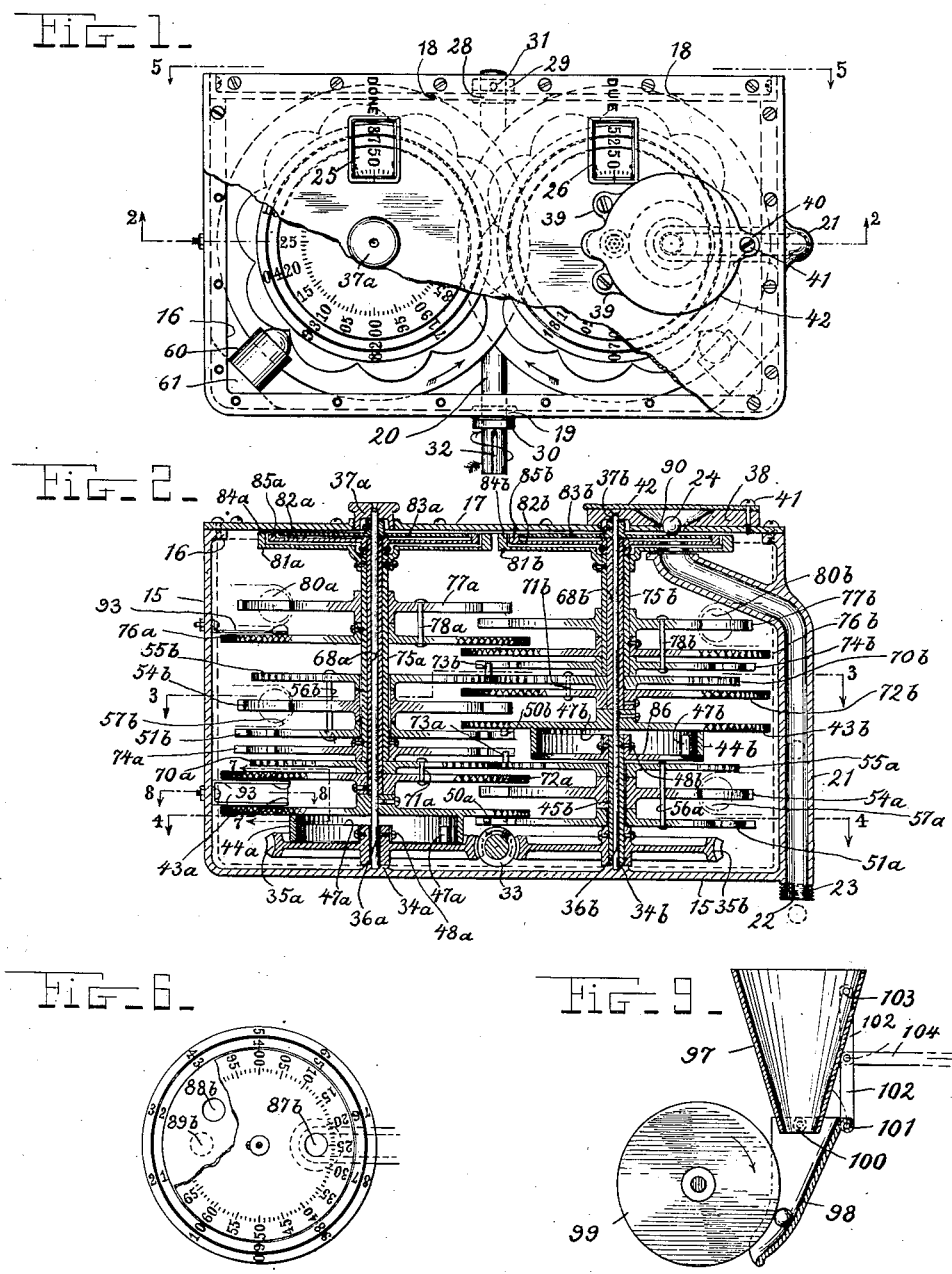
Inventor
Richard A. Hoffmann March 17, 1925.
R. A. HOFFMANN
STOP MECHANISM REGISTER
Original Filed Nov. 26, 1921  2 Sheets-Sheet 2
1,530,366
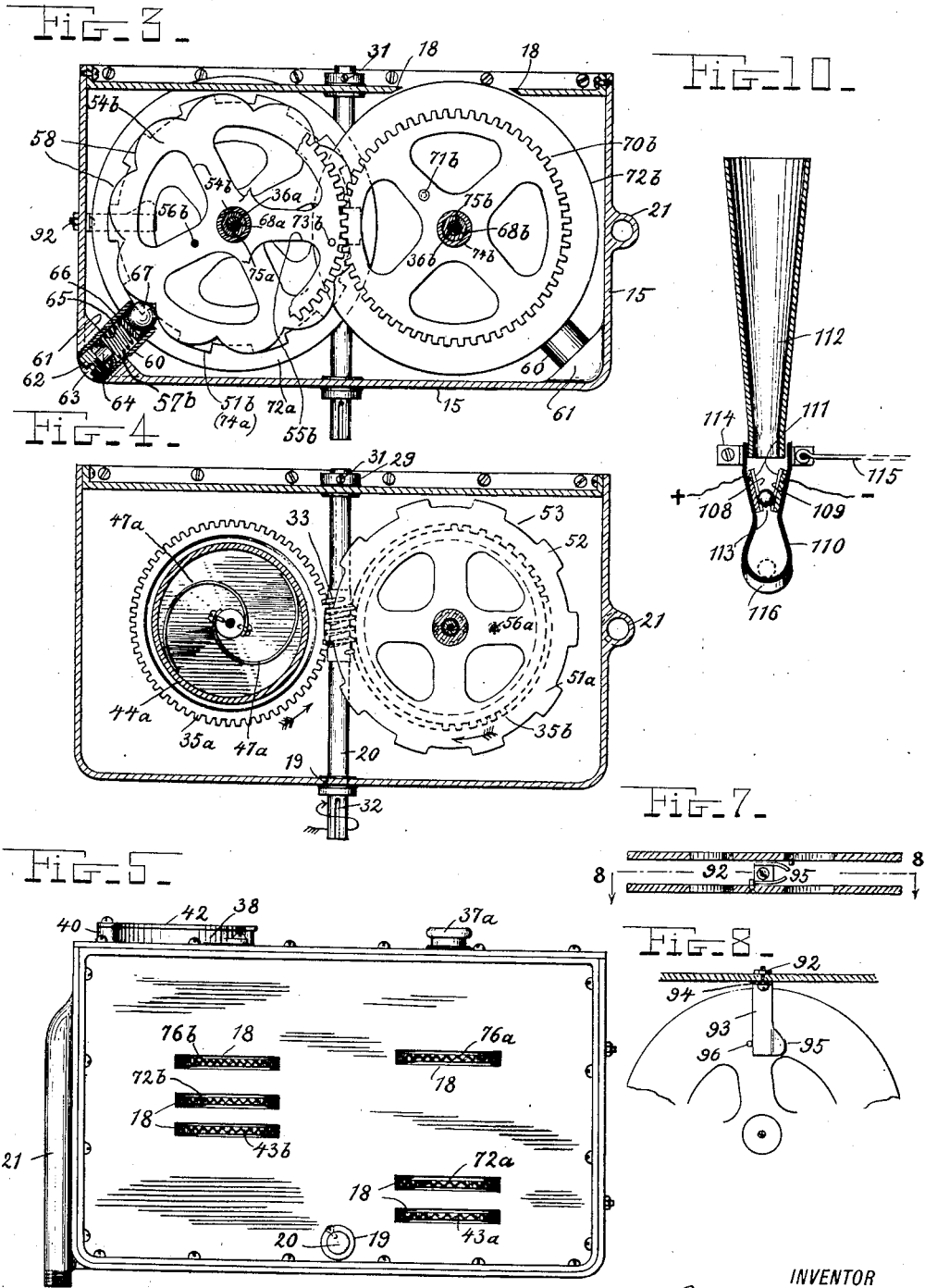
INVENTOR
Richard A. Hoffmann Patented Mar. 17, 1925.

1,530,366

UNITED STATES PATENT OFFICE.

RICHARD A. HOFFMANN, OF ROSEBANK, NEW YORK, ASSIGNOR TO ERIC A. BLACK, OF ORANGE, NEW JERSEY; ENRY S. FRAMPTON AND CLEVELAND WHITLOCK, BOTH OF BROOKLYN, NEW YORK.

STOP-MECHANISM REGISTER.

Application filed November 26, 1921, Serial No. 517,908. Renewed September 22, 1924.

*To all whom it may concern:*

Be it known that I, RICHARD A. HOFFMANN, a citizen of the United States, residing at Rosebank, in the county of Richmond and State of New York, have invented certain new and useful Improvements in Stop-Mechanism Registers, of which the following is a specification.

This invention relates to improvements in registering or counting apparatus where, when a certain predetermined number of units is reached, to which the device originally has been set and adjusted, the apparatus will automatically release a temporarily checked movement or initiate the mechanical or electrical function of certain means. Thereby—if so intended—the work of an industrial machine or a process which has been going on while the apparatus was registering the units, may at once be interrupted and brought to a standstill. By logical inference this purpose and employment of the registering apparatus may also be reversed, that is: a period of non-activity, while the device counts the units, may be stopped and replaced by a period or single moment of activity.

The apparatus may for instance be adapted to discharge a time-fuse, to unlock a safe, to light a beacon, or even sound an alarm only, all of which effects could be produced by the use and adaptation of such stop mechanism registers. The units which the register measures and counts, may be only time-units, provided that the device forms the annex of and is driven by a chronometer or common clock-work. This wide field of application is of course also accessible to the present invention.

In general however this novel stop mechanism register is designed to be used as a counting device and stop-mechanism for industrial machines, for instance printing and lithographic presses, to count and control the number of copies, or for other manufacturing machines, and more particularly it is intended to be used to measure and control the yardage of warps or textile fabrics in knitting and weaving machines, and to release suitable means of automatic stops in these machines.

A further peculiarity of this invention consists in the immediate effect and the means of operation employed to initiate the ultimate result; it detaches and drops at a predetermined moment a little ball or weight which is to give the impetus for the automatic disengagement of the industrial machine, whether the stopping contrivance itself is of a mechanical or of an electrical nature.

The first object of the invention therefore is to devise a counting machine adapted to have motion imparted to it by another mechanism to which it is attachable.

The second object is to devise an apparatus adapted to register and indicate the number of impulses or revolutions communicated to it.

A third object is to furnish this apparatus with a contrivance which at any predetermined and adjustable number will cause the release of a drop weight by which certain mechanical or electrical results may be accomplished.

A fourth object is to devise a registering apparatus, adapted to perform a releasing function at a predetermined number and indicating at all times the remaining numbers to be registered before the predetermined number is reached.

A fifth object is to furnish means whereby, before the apparatus begins to register and after it has performed its ultimate releasing function, its indicators may be quickly and conveniently restored to the zero mark.

A sixth object is to provide means whereby the selection and setting of the releasing number can be quickly and conveniently accomplished without regard to the condition and incidental setting of the registering indicator.

These various objects are attained by the novel mechanism and combination of parts, described hereafter and shown in the accompanying drawings, in which:

Figure 1 is a top view of the stop mechanism register, part of the lid being shown broken away to disclose the indicating dials and cam wheels below them.

Figure 2 is a sectional view taken on line 2—2 of Figure 1.

Figure 3 is a sectional view taken on line 3—3 of Figure 2.

Figure 4 is a sectional view taken on line 4—4 of Figure 2.

Figure 5 is a rear view of the apparatus taken on line 5—5 of Figure 1.

Figure 6 is a detail of the set of dials for the setting of the predetermined number and indicating the respective remaining numbers before the chosen number is reached.

Figure 7 is a sectional view taken on line 7—7 of Figure 2 and showing a detail of the zero stops.

Figure 8 is a sectional view taken on line 8—8 of Figure 2 and Figure 7.

Figure 9 is a diagrammatical illustration of a mechanical impetus, which may be accomplished by the drop weight, resulting in the stoppage of a wheel.

Figure 10 is a diagrammatical illustration of an electrical impetus, produced by the drop weight and resulting in the closing of a current.

Referring to the drawings number 15 in Figure 2 represents an external box-like casing, opening at the top, to receive and sustain the internal mechanism hereinafter described. The upper rim of the casing is provided with a flange 16 onto which is ordinarily fastened by screws the lid or cover 17. The casing has on one side several slits 18 (Figure 5) for a purpose explained below, and is otherwise appropriately shaped and provided with all apertures and projections that the proper sustenance and function of the inner mechanism will require. In special it has an inlet 19, which may be bossed or flanged for the entrance and support of the driving shaft 20, and a channel, or groove, or tubular guide 21 with an outlet 22 for the drop weight 24. The outlet may, if necessary, be provided with a thread 23 or otherwise appropriately shaped to attach an outer tube or hose to it, providing for the further course the drop weight is to take.

The cover 17 has two openings 25 and 26, which may be closed by glass panels and through which single numbers on the face of the indicator dial are viewed, and is otherwise provided with all openings and purtenances referred to later, which the proper construction of the inner mechanism will require.

The horizontal driving shaft 20, supported in the journals 19 and 28 of the casing 15, is provided on one end with a loose collar 29, fastened by a set screw 31, and on the other end with another collar 30, which may be integral with the shaft 20. These collars confine the shaft 20 in an axial direction and secure it in the bearings. On the extreme protruding end the shaft is provided either with a key-way 32 or some other means to couple it to a driving shaft which may impart a continuous revolution or single rhythmic impulses to shaft 20.

On shaft 20 is securely fastened a worm 33 (Figure 4) which drives two worm gears 35$^a$ and 35$^b$, mounted in the same plane with the axis of the worm shaft and geared into the worm on diametrically opposite sides of the latter. These worm gears are mounted on vertical and parallel spindles 36$^a$ and 36$^b$ respectively, which on their lower ends run in step bearings 34$^a$ and 34$^b$, formed in the casing. The spindle 36$^a$ is journalled on its upper end in a separate bearing 37$^a$, threaded into a bossed opening of the lid 17, and the spindle 36$^b$ is on its upper end journalled in a bearing 37$^b$, integral with the cup-shaped receptacle 38, which is attached to the cover by the two lugs 39, and the projection 40. These three parts are held to the cover by screws, tapped through them, and the third screw 41 serves at the same time as a hinge pin on which the lid 42 of the receptacle is rotatably fastened, so that by pushing it sideways the receptacle may be uncovered. The purpose of the receptacle will be explained later in its proper relation.

On the two upright spindles 36$^a$ and 36$^b$ are mounted two series of wheels, each series forming a train of interacting wheels and gears, but working independently throughout from the other series. The two series are characterized in the drawing by the indices "a" or "b," attached to the numerals, but are not each separately mounted on one spindle. When necessary, they cross over to the other spindle, where they are loosely mounted, to transmit their motion back again to the wheel next in their own series on their main spindle.

The spindles themselves in their wider conception are not simple solid round shafts, but are in addition surrounded by hollow cylindrical pieces telescoping each other and rotating about the solid inner shafts, the spindles proper. On these hollow cylinders as well as on the solid spindles are mounted, partly loose, partly fixed by set screws, as shown, or by pins or some other convenient means the wheels and dials described hereafter.

The wheel series "a" which comprises the wheel train that registers the measuring units from zero upwards to say 10,000, as the apparatus chosen for illustration is marked on its dials, is described first. The worm gear 35$^a$ which imparts movement to this gear train, is running loosely on the solid spindle 36$^a$ and, as the arrows and the worm windings in Figure 4 indicate, counter-clockwise.

Over this worm gear is mounted fixedly on the solid spindle 36ª the adjusting wheel 43ª. These adjusting wheels consist of a flat disc, whose outer rim is knurled or ribbed to offer a better grip to the finger when adjusting it. The diameters of all adjusting wheels are equal and greater than those of all other kinds of wheels employed in the apparatus. The dimensions of the outer casing 15 are so proportioned that at the rear wall, shown in Figure 5, these adjusting wheels protrude with a small segment through the slits 18 to the outside where they can be moved by hand back and forth for adjustment. By adjustment in this case is to be understood the turning of the wheels until the numerals on the dials reach zero.

In the case of the second or "stop series" of wheels the adjusting consists in the predetermination of the final number and in setting the dials on this number. The lowest adjusting wheels in both series, in this case 43ª, are provided with an annular flange 44ª, extending downward and almost touching the wheel below. On the hub of this wheel are fastened by screws 48ª two flat springs 47ª fastened on opposite sides of the hub and bent into spiral segments, both in the direction in which the worm gear rotates. These springs must be strong enough to take the annular flange together with the whole respective series of wheels along by friction when the worm gear 35ª moves. See Figure 4.

On the other hand it will be found, when the worm 33 and gear 35ª is at a standstill, that the adjusting wheels can be turned by hand quite easily without moving the worm gearing, the friction between the worm spiral and the teeth of the worm gear being too great to be overcome, not to mention the resistance which is added through the shaft 20 being attached to an outside machine. In this way the springs 47ª and the flange 44ª form a friction coupling of limited strength.

On one point of its under side the adjusting wheel is provided with a short pin or peg 50ª which once at every revolution of the wheel engages with the teeth of a gear 51ª, running loose on the hollow cylinder or sleeve 45ᵇ of the second spindle. This gear is provided with ten very spacious teeth and intervals, 52 and 53, as shown in Figure 4, and this is done in order to provide considerable play between the peg 50ª and either of the adjoining teeth. On completing one revolution the wheel 43ª will impart a short impetus to the gear 51ª, just enough to let the peg 50ª pass by.

Above this gear, also loose on the shaft, are mounted in series the cam wheel 54ª and the spur gear 55ª. The set of these three wheels is coupled together by a vertical pin 56ª, passing through a perforation in each of these wheels and riveted over at the ends, so that the three wheels must rotate in unison. The shape of the cam wheels 54ª, together with the construction of the spring-buffer 57ª which in Figure 2 is only indicated by dotted lines, and which controls the detent, can best be perceived from Figure 3, in which the corresponding set of wheels of the second series is illustrated. The wheels 51ᵇ, 54ᵇ, 55ᵇ and the buffer 57ᵇ are of the same pattern and size as the parts indexed by "a".

The wheel 54ᵇ has a cam-like periphery, that is, its outline is formed by ten consecutive convexed arcs 58, resembling circular segments.

The buffer 57ᵇ comprises a pipe nipple 60 which is tapped into a broad rib 61, formed in the corner of the casing 15. This nipple is closed towards the outside of the casing by a thread plug 62, being slotted, as shown at 63, so as to be adjustable, and reduced on the inside to a short pivot 64, so as to form thereby the seat for a little coil spring 65, which is covered by a brass washer 66, on which rests a polished steel ball 67, which is pressed by the spring against the cam-like periphery of the cam wheel.

It is evident now that when the cam wheel is turned in either direction it can only come to rest on either of the notches, formed by the intersection of the ten peripherical arcs. Consequently the wheel 43ᵇ, or 43ª for 54ª, which is moving continuously and steadily, will after each revolution by the means of its peg 50ᵇ, or 50ª, cause the cam wheel 54 ("a" or "b"), respectively, to jump ahead for exactly one tenth of a revolution. This jerk of the cam wheel, accelerated and checked by the mechanism of the spring buffer causes the wheels 51ᵇ, or 51ª, and the spur gears 55ª or "b," respectively, to jump simultaneously.

Returning now to the contemplation of the "a" series, the spur gear 55ª transmits its sudden periodical movements to another spur gear 70ª, of the same pitch diameter, mounted on a sleeve 68ª which surrounds the spindle 36ª. Below this spur gear is fixedly mounted on the same sleeve and coupled by the pin 71ª to the spur gear 70ª the adjusting wheel 72ª, bringing thereby the spur gear also into rigid connection with the sleeve 68ª. The first spur gear 55ª on the "b" spindle is provided with a peg 73ª which drives a toothed gear 74ª in a similar way as the wheel 43ª drives the toothed gear 51ª by means of the peg 50ª. The toothed gears are also of the same size and pattern, except that the gear 74ª is fixedly mounted on the sleeve 75ª, whereas 51ª is running loose. On the same sleeve 75ᵃ are also fixedly mounted the adjustment wheel 76ᵃ and the cam wheel 77ᵃ, the first being fastened directly on the sleeve and the latter being coupled through the pin 78ᵃ to the wheel 76ᵃ. The cam wheel engages the spring buffer 80ᵃ, and this set of parts, 74ᵃ, 76ᵃ, 77ᵃ, and 80ᵃ has a similar construction and action as the set 51ᵃ, 54ᵃ and 57ᵃ.

The inner spindle 36ᵃ, the middle sleeve 68ᵃ and the outer sleeve 75ᵃ end on their respective tops at three different heights, forming thereby three steps, and on their free and exposed ends three dials are consecutively mounted, 81ᵃ, 82ᵃ and 83ᵃ. The two outer dials are dished, so that their protruding rims 84ᵃ and 85ᵃ form a flush surface with the inner dial 83ᵃ. All dials are fixedly mounted on their respective sleeves and spindles, and their faces are provided with graduations and numerals, as may be required and as illustrated in Figures 1 and 6.

The inner dial 83ᵃ, which sits on spindle 36ᵃ and is driven by wheel 43ᵃ, friction clutch 44ᵃ, 47ᵃ and worm gear 35ᵃ, is rotating steadily and represents the numerals up to 100. The middle dial sits on sleeve 68ᵃ, is driven by wheel 72ᵃ, moves by jumps in the ratio 1 to 10 to the inner dial and represents the numerals from 100 to 1000. The outer dial sits on sleeve 75ᵃ, is driven by 74ᵃ, moves also by jumps in the ratio 1 to 10 to the middle dial and represents the numerals from 1000 to 10,000.

The second or "stop" series of wheels, to be described presently, is working on the same principles and is arranged in a much similar manner as the series just described. It will therefore only be necessary to enumerate the sequence of wheels and point out the slight deviations in arrangement and operation, after which it remains to describe the features and purtenances added to either series which constitute their important differences in purpose and function.

The sequence of wheels in the second series is as follows:

Worm gear 35ᵇ drives adjusting wheel 43ᵇ by the friction clutch, comprising parts 44ᵇ and 47ᵇ. Wheel 43ᵇ drives 51ᵇ by means of peg 50ᵇ. Wheels 51ᵇ, 54ᵇ and 55ᵇ are running loose on sleeve 75ᵃ and are coupled together by pin 56ᵇ. Cam wheel 54ᵇ is controlled by spring buffer 57ᵇ. Spur gear 55ᵇ drives 70ᵇ, coupled to 72ᵇ by pin 71ᵇ. Wheel 55ᵇ drives also 74ᵇ by means of peg 73ᵇ. Wheels 74ᵇ, 76ᵇ and 77ᵇ are coupled together by pin 78ᵇ. Cam wheel 77ᵇ is controlled by spring buffer 80ᵇ.

All deviations from the former arrangement are caused by the interference with wheels belonging to the other series which also necessitates to add to the worm gear 35ᵇ an extension in the form of a disc-wheel 86 coupled with 35ᵇ by means of the extra sleeve 45ᵇ to which both are fastened by set screws or otherwise. On the hub of this disc-wheel the springs 47ᵇ are fastened which engage the flange 44ᵇ of the wheel 43ᵇ.

The inner dial 83ᵇ sits on the spindle 36ᵇ and is driven by wheel 43ᵇ. The middle dial 82ᵇ sits on sleeve 68ᵇ and is driven by wheel 72ᵇ. The outer dial 81ᵇ sits on sleeve 75ᵇ and is driven by 76ᵇ, coupled with 74ᵇ and 77ᵇ.

If now these dials are ciphered in the same way and direction as the first set of dials, and if it is remembered that the worm gear 35ᵇ is running in an opposite direction to 35ᵃ, driving of course the whole superimposed series of wheels in this direction, it is evident that the dials will not register from zero upwards, but from whatever number has been set, downwards to zero.

It is furthermore to be mentioned, that in both series the pegs 50 and 73, "a" and "b," must be so arranged in regard to the position of the dials that motion is imparted by them to the wheel next in the series whenever the cipher 0 is following 9 in the little glazed opening 25 and 26 or vice versa.

It is also understood that, following the same principles, the number of dials and corresponding sets of wheels could be increased and followed up beyond the numerals 10,000 or that the ciphering of the dials or even the ratio of transmission may be varied. By providing for instance the toothed gears 51 and 74 and the cam wheels 54 and 77 with twelve teeth or intersecting arcs instead of ten and ciphering the dials correspondingly the registering apparatus could be made to count dozens and grosses.

The three dials of the second series are furthermore each provided with a circular hole 87ᵇ, respectively 88ᵇ or 89ᵇ, located in such a way, that when the disc registers zero, the hole is just below the center of the cup-shaped receptacle 38. As this receptacle is perforated in the center and this perforation registers with another perforation 90 in the cover 17, it will be understood that, when all three discs register zero, the holes will be all in alignment and a little ball or appropriate weight, which has previously been placed in the cup-shaped receptacle 38 will, when this happens, drop right into and through the channel 21, as indicated in Figure 2.

There are no appliances for the first series of wheels corresponding to the features just described. Instead of it there are zero-stops provided for the three adjustment wheels 43ᵃ, 72ᵃ and 76ᵃ, peculiar and exclusive to this series, and they are constructed as follows.

Fastened to the casing 15 by nutted screws 92 (see Figures 7 and 8) is a flat thin spring blade 93, bent inwards at right angles at 94 and following for some distance the surface of the adjustment wheel with as little clearance as possible. At the inner end this spring blade has a side extension in the form of a lip 95, bent away from the face of the wheel in an easy rounded curve. At a distance from the center of the wheel which corresponds to the position of this lip there is fastened a little protuding peg 96. The lip 95 must be formed on that side of the blade 93, where it will meet the oncoming peg when the dials are counting upwards, and the peg (and with it, the whole adjustment wheel) must be placed so that, when the dial, corresponding to the adjustment wheel is standing at zero, the peg will just touch the smooth rim of the blade 93, opposite the lip 95, as Figure 8 shows.

It is therefore apparent, that in the normal running of the apparatus, when the pegs are running in the working direction of the dial, they will strike the lips first, lift them up and pass under the spring blades, these being rather weak and resilient, without causing any noticeable resistance to the revolving wheel. If however the wheel is turned by hand in the opposite direction they will strike the smooth rim of 93 first and stop the wheel at a position which coincides with the zero-position of the respective dial.

The blades 93 may be single blades as shown in Figure 2 for wheel 76ª, or two of them may be jointed into one in the form of a U, as shown for wheels 72ª and 43ª.

As the forms of the wheels and other parts repeat themselves, the number of patterns or cutting dies, necessary for their manufacture, is small, and the spur gears 55ª, "b," and 70ª, "b," can be of any suitable commercial standard make. The dials are advantageously made of non-metallic material, like white opaque celluloid or ivory. The casing may be a casting or be composed of single plates and a pipe for the ball run, and it will be found, that the construction of the mechanism is not very expensive.

The application of the ball or drop weight 24, when released by the apparatus is manifold and will vary according to the different purposes for which the register is used.

A few suggestions however will not be out of place and help to illustrate the idea.

Figure 9 indicates how the little ball 24 will drop through a funnel 97 into a concave brake-shoe 98, where it will wedge itself between the inner surface of the brake-shoe and the outer rim of a wheel 99 which consequently it will stop by friction. The wheel 99 may form a part of a machine whose motion the counting apparatus is supposed to stop or control. The brake-shoe which is hinged at 100 to the funnel 97 and at 101 to a toggle joint 102, supported at 103 and provided with a handle 104, can be opened by the manipulation of this toggle joint, to remove the ball when the machine is to start again. The old Wheeler-Wilson sewing machines for instance employed a similar stopping device, and in that case the ball was made of caoutchouc or india rubber. A number of other mechanical devices utilizing a ball stop, are also well known to persons skilled in the art.

Figure 10 shows the employment of the ball for producing an electrical contact.

Metallic terminal plates 108 and 109 are supported on the inside of a resilient channel 110 of insulating material. The plates are located opposite to each other, and the channel is bent and formed in such a way that the plates will not touch each other, but leave an interstice or slit 113 between them, narrower than the diameter of the ball 67. On the sides the plates are provided with little flanges or ridges 111 to confine the ball between the plates, when it has dropped through the funnel 112 into the slit 113, forming thereby a contact between the terminals and closing the open current. One side of the channel is made stationary, as suggested by the screwed on bracket 114, while to the other side of the channel a handle 115 may be fastened, which, when pulled, will widen the gap between the terminals and in this way let the ball drop into the somewhat pitched channel, as indicated at 116, and break the current again.

There is also a number of modifications possible in the line of electrical contacts utilizing a ball contact.

Thus it will be seen that the objects of the invention are fully met, but, as the execution of them may vary very much for the apparatus itself as well as for the employment of it for different purposes, it is the leading principles rather than the details as illustrated and described, that the following claims seek to protect:

1. In a stop mechanism register, the combination with a series of wheels, adapted to register consecutive numbers; of a loose, drop weight, unconnected to the device, but normally held in suspension by it, and a release for said drop weight, releasing it at a predetermined number, to initiate after its free fall certain suspended movements of an outside and independently working apparatus with which the register may be connected.

2. In a stop mechanism register, the combination with other intermediate operating and transmitting elements; of a drop weight, a series of dials, with stepped consecutive digit rings, one dial superimposed upon the other, a composite spindle, comprising a solid center shaft and a plurality of quill shafts, telescoping each other, the uppermost dial fastened on the centershaft, the lower dials on the quill shafts, each dial being provided with an aperture, equi-distant from the center and adapted to register with all other apertures, when the dials register the zero ciphers in alignment, and to form thereby a passage-way to let said drop weight pass through.

3. In a stop mechanism register, the combination with other intermediate operating and transmitting elements; of a cam wheel, the periphery of which is described by a series of consecutive equal segmental arcs, forming a series of indentations between them, and an automatic antifrictional stop, comprising substantially a spherical member, adapted to engage with said indentations by a single point-rolling contact, a resilient element, supporting said spherical member, tending to propel the spherical member radially against the periphery of said wheel, a support for said resilient element, means guarding the spherical member against travelling in other but radial directions, substantially as described and for the purpose of securing an advancement of the cam wheel at equal steps and momentous impulses.

4. In a stop mechanism register, comprising two trains of synchronous wheels, one train registering upwards to a predetermined stopping member, the other showing the respective remaining numbers, means to actuate said wheels cooperatingly and means to actuate a stopping device, adapted to stop some outside machinery to which said stop mechanism register may be applied, the combination with a wheel, manually adjustable and adapted to communicate this adjustment to other intermediate operating and transmitting elements of the upwardly registering train of wheels it is engaged with; of a zero stop, comprising substantially a flat spring, mounted in close juxtaposition to the side of said wheel and provided with an obliquely upturned lip at its free end, a pintle, fixedly attached to the same side of the wheel, the spring and the pintle being arranged in such a way that, when the wheel and the other elements, connected with it, are normally operating, and registering increasing numbers, the pintle strikes the lip and uplifts the resilient end of the spring, passing underneath it, but, when the wheel is manually adjusted, registering downwards, the pintle strikes the spring on its flat edge, opposite the lip, when the zero mark is reached, thus arresting the wheel and its connecting elements.

In testimony whereof, I have signed my name to this specification in the presence of two subscribing witnesses, this 14th day of September 1921.

RICHARD A. HOFFMANN.

Witnesses:
JOHN H. JERICHO,
JOS. R. FERNANDEZ.